(12) United States Patent
Fuegen et al.

(10) Patent No.: US 11,107,462 B1
(45) Date of Patent: Aug. 31, 2021

(54) METHODS AND SYSTEMS FOR PERFORMING END-TO-END SPOKEN LANGUAGE ANALYSIS

(71) Applicant: Facebook, Inc., Menlo Park, CA (US)

(72) Inventors: Christian Fuegen, Sunnyvale, CA (US); Yongquiang Wang, Menlo Park, CA (US); Anuj Kumar, Menlo Park, CA (US); Baiyang Liu, Issaquah, WA (US); Dmitrii Serdiuk, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 121 days.

(21) Appl. No.: 16/175,086

(22) Filed: Oct. 30, 2018

Related U.S. Application Data

(60) Provisional application No. 62/578,686, filed on Oct. 30, 2017.

(51) Int. Cl.
*G10L 15/22* (2006.01)
*G10L 15/18* (2013.01)
*G10L 15/16* (2006.01)

(52) U.S. Cl.
CPC .......... *G10L 15/1815* (2013.01); *G10L 15/16* (2013.01); *G10L 15/22* (2013.01)

(58) Field of Classification Search
CPC .................................................. G10L 15/1815
(Continued)

(56) References Cited

U.S. PATENT DOCUMENTS

| | | | |
|---|---|---|---|
| 2003/0044078 A1* | 3/2003 | Joshi | G06T 9/008 382/243 |
| 2014/0180674 A1* | 6/2014 | Neuhauser | G10H 1/0008 704/9 |

(Continued)

OTHER PUBLICATIONS

Sourabh Ravindran, C. Demirogulu and D. V. Anderson, "Speech recognition using filter-bank features," The Thrity-Seventh Asilomar Conference on Signals, Systems & Computers, 2003, Pacific Grove, CA, USA, 2003, pp. 1900-1903 vol. 2, doi: 10.1109/ACSSC.2003. 1292312 (Year: 2003).*

(Continued)

*Primary Examiner* — Bharatkumar S Shah
(74) *Attorney, Agent, or Firm* — Kacvinsky Daisak Bluni PLLC

(57) ABSTRACT

Exemplary embodiments relate to improvements in spoken language understanding (SLU) systems. Conventionally, SLU systems include an automatic speech recognition (ASR) component configured to receive an input of audio data and to generate a textual representation of the audio data. Conventional SLU systems also include a natural language understanding (NLU) component configured to receive a text-based transcript and perform language-based tasks such as domain classification, intent determination, and slot-filling. However, these two components are typically trained separately based on different metrics. In real-world situations, errors in the ASR component propagate to the NLU component, which degrades the performance of the overall system. Exemplary embodiments described herein perform SLU in an end-to-end manner that infers semantic meaning directly from audio features without an intermediate text representation. This may allow for more a more accurate translation performed in a more resource-efficient manner (particularly in terms of processing resources).

20 Claims, 8 Drawing Sheets

(58) Field of Classification Search
USPC .......................................................... 704/232
See application file for complete search history.

(56) References Cited

U.S. PATENT DOCUMENTS

2018/0366112 A1* 12/2018 Aleksic ................... G10L 15/22
2019/0130904 A1* 5/2019 Homma ................... G10L 15/26

OTHER PUBLICATIONS

S. V. Chougule, M. S. Chavan and M. S. Gaikwad, "Filter bank based cepstral features for speaker recognition," 2014 IEEE Global Conference on Wireless Computing & Networking (GCWCN), Lonavala, 2014, pp. 102-106, doi: 10.1109/GCWCN.2014.7030857. (Year: 2014).*

D. N. Muller, M. L. de Siqueira and P. O. A. Navaux, "A Connectionist Approach to Speech Understanding," The 2006 IEEE International Joint Conference on Neural Network Proceedings, Vancouver, BC, 2006, pp. 3790-3797, doi: 10.1109/IJCNN.2006.247398. (Year: 2006).*

Sourabh Ravindran, C. Demirogulu and D. V. Anderson, "Speech recognition using filter-bank features," The Thrity-Seventh Asilomar Conference on Signals, Systems & Computers, 2003, Pacific Grove, CA, USA, 2003, pp. 1900-1903 vol. 2, doi: 10.1109/ACSSC.2003.1292312 (Year: 2003) (Year: 2003).*

S. V. Chougule, M. S. Chavan and M. S. Gaikwad, "Filter bank based cepstral features for speaker recognition," 2014 IEEE Global Conference on Wireless Computing & Networking (GCWCN), Lonavala, 2014, pp. 102-106, doi: 10.1109/GCWCN.2014.7030857. (Year: 2014) (Year: 2014).*

D. N. Muller, M. L. de Siqueira and P. O. A. Navaux, "A Connectionist Approach to Speech Understanding," The 2006 IEEE International Joint Conference on Neural Network Proceedings, Vancouver, BC, 2006, pp. 3790-3797, doi: 10.1109/IJCNN.2006.247398. (Year: 2006) (Year: 2006).*

N. Gupta, G. Tur, D. Hakkani-Tur, S. Bangalore, G. Riccardi and M. Gilbert, "The AT&T spoken language understanding system," in IEEE Transactions on Audio, Speech, and Language Processing, vol. 14, No. 1, pp. 213-222, Jan. 2006, doi: 10.1109/TSA.2005.854085. (Year: 2006).*

* cited by examiner

Sequence-to-Sequence Logic
500

METHODS AND SYSTEMS FOR PERFORMING END-TO-END SPOKEN LANGUAGE ANALYSIS

RELATED APPLICATIONS

This application claims priority to U.S. Provisional Application Ser. No. 62/578,686, filed on Oct. 30, 2017 and entitled "Towards End-to-End Spoken Language Understanding," the contents of which are hereby incorporated by reference.

BACKGROUND

With the growing demand of voice interfaces for mobile and virtual reality (VR) devices, spoken language understanding (SLU) has received many researchers' attention recently. SLU systems accept an input audio recording of spoken language and generate an output based on the semantic meaning of the input. For instance, the SLU system may receive input audio corresponding to a question (e.g., "what is the high temperature today?" or "I'd like to buy a coffee") and determine a domain of the question (e.g., "weather") or an intent of the question (e.g., "purchase intent"). In some situations, SLU systems may be used to perform a slot-filling task, in which a user's answers to queries are matched against a list of questions.

Spoken language understanding systems are traditionally designed as a pipeline of a number components. First, an input audio signal is processed by an automatic speech recognition (ASR) system for transcription into text (some ASR systems output the n best textual hypotheses). With the recognition results, a natural language understanding (NLU) system classifies the text into structured data such as domain, intent and slots for downstream consumers. Such downstream consumers may include dialog systems, hands-free applications, and the like.

DETAILED DESCRIPTION

Exemplary embodiments relate to improvements in spoken language understanding (SLU), and are described in more detail below. Before further discussing the exemplary embodiments, however, a general note regarding data privacy is provided.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Spoken Language Understanding

Figure 1:
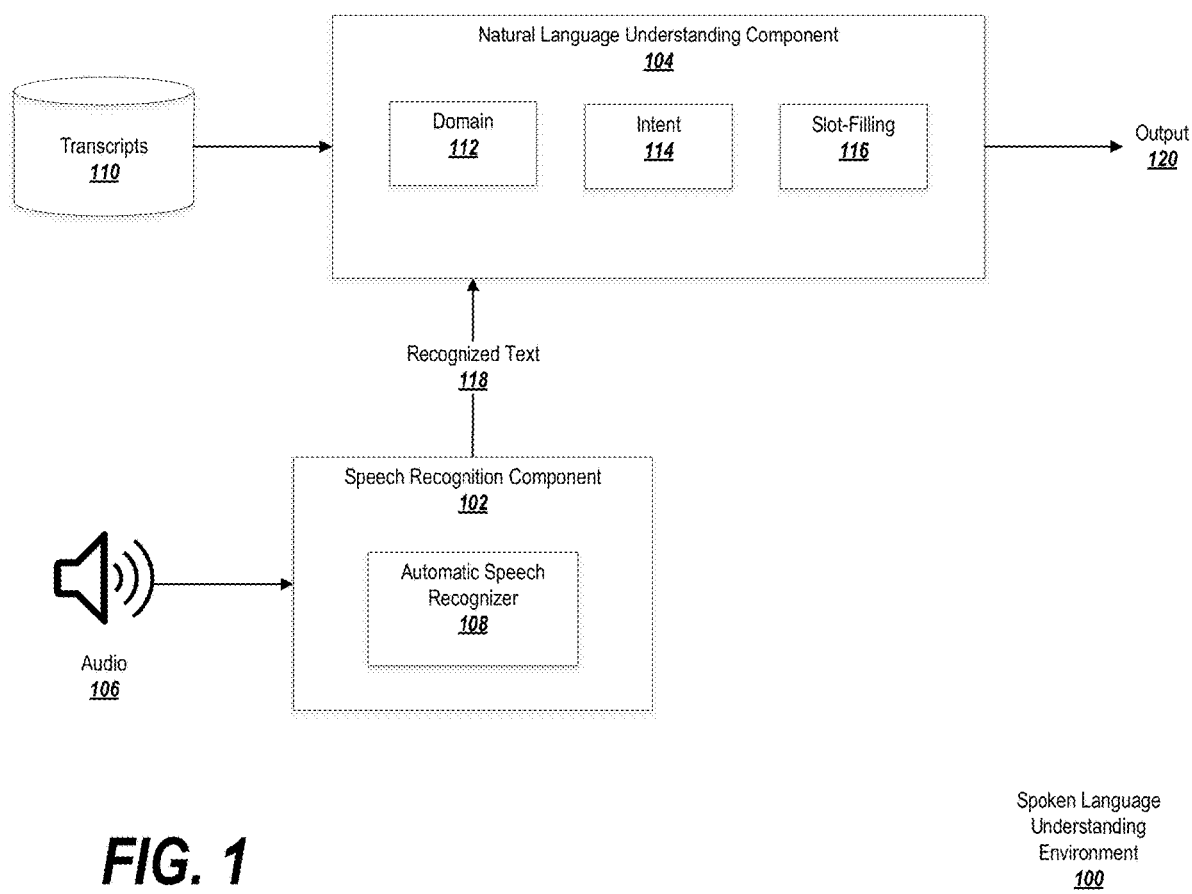
FIG. 1 depicts an example of a spoken language understanding environment.

Exemplary embodiments relate to improved spoken language understanding (SLU) systems that perform SLU in an end-to-end manner that infers semantic meaning directly from audio features without an intermediate text representation. As discussed in more detail below, this represents an improvement over typical SLU environments, such as the exemplary SLU environment 100 depicted in FIG. 1.

The typical SLU environment 100 includes a speech recognition component 102 and a natural language understanding component 104. During training, audio data 106 is provided to the speech recognition component 102, which trains an automatic speech recognizer 108 to process the audio data 106 into corresponding recognized text 118. Optionally, an inverse text normalization module may translate the spoken domain text into the written domain.

Figure 2A:
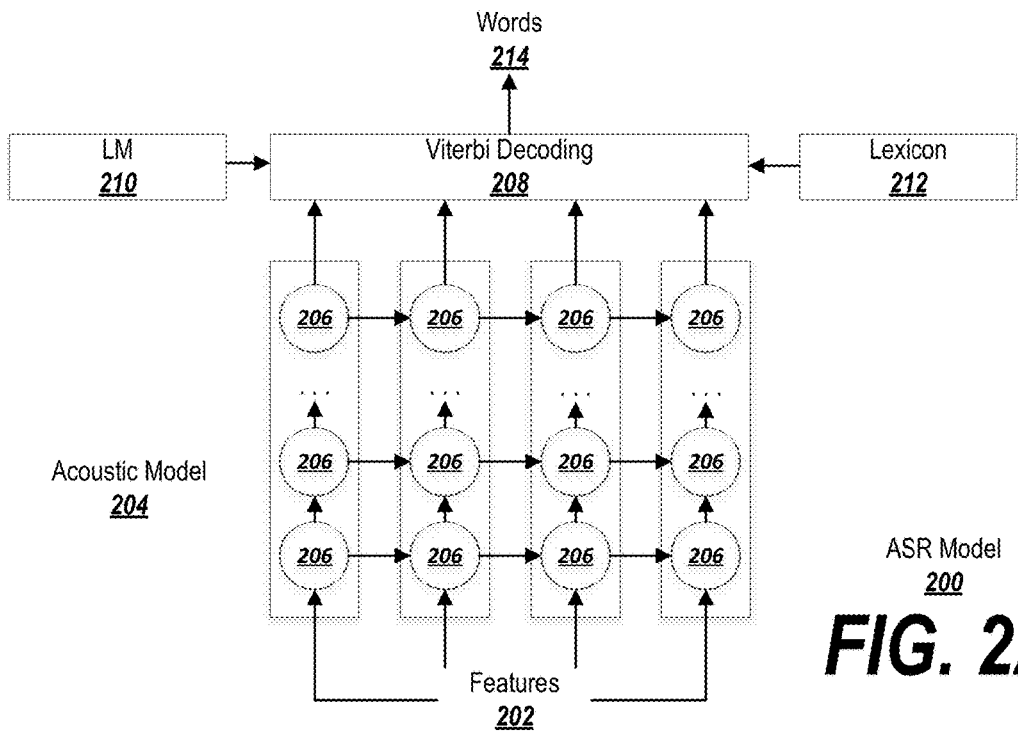
FIG. 2A depicts an example of an automatic speech recognition system.

FIG. 2A depicts an example of a model 200 suitable for use as an ASR 108. Given a sequence 202 of feature vectors $X=(x_1, \ldots, x_T)$, the model 200 is trained to find the most likely word sequences $W^*=(w_1, \ldots, w_n)$ using the chain rule:

$$W^* = \underset{W}{\mathrm{argmax}}\, p(W \mid X) = \underset{W}{\mathrm{argmax}}\, p(X \mid W) p(W). \qquad \text{Eq (1)}$$

Therefore, the ASR system is usually derived into two models: an acoustic model (AM) $p(X|W)$ and a language model (LM) $p(W)$. CD-HMM-LSTM is widely used as an AM, in which the feature vector sequence 202 is converted to likelihood vectors of context-dependent Hidden Markov Model (HMM) states for each acoustic frame. Together with the LM p(W) 210 (usually a statistical n-gram model) and a dictionary 212, a Viterbi decoder 208 is used to search the most likely word sequence 214. In the depicted example, the core part of the AM is a multi-layer long short-term memory network 204 made up of a number of nodes 206, which predicts the probability of CD-HMM states for each frame. Since most SLU systems require spontaneous response, typically only a uni-directional LSTM is used.

Returning to FIG. 1, a natural language understanding component 104 may be trained using tagged transcripts 110. The transcripts 110 may be tagged with an intent, a domain, designated slots, etc., depending on the task(s) to be performed by the NLU component 104. The transcripts 110 may or may not corresponding to the audio data 106 used to train the SR 102. Using the tagged transcripts 110, the NLU component 104 may train various modules, such as a domain identification module 112, an intent determination module 114, and/or a slot-filling module 116. In some cases, the NLU component 104 may perform domain and intent classification with the modules 112, 114, and may perform slot filling based on different identified intents.

Figure 2B:
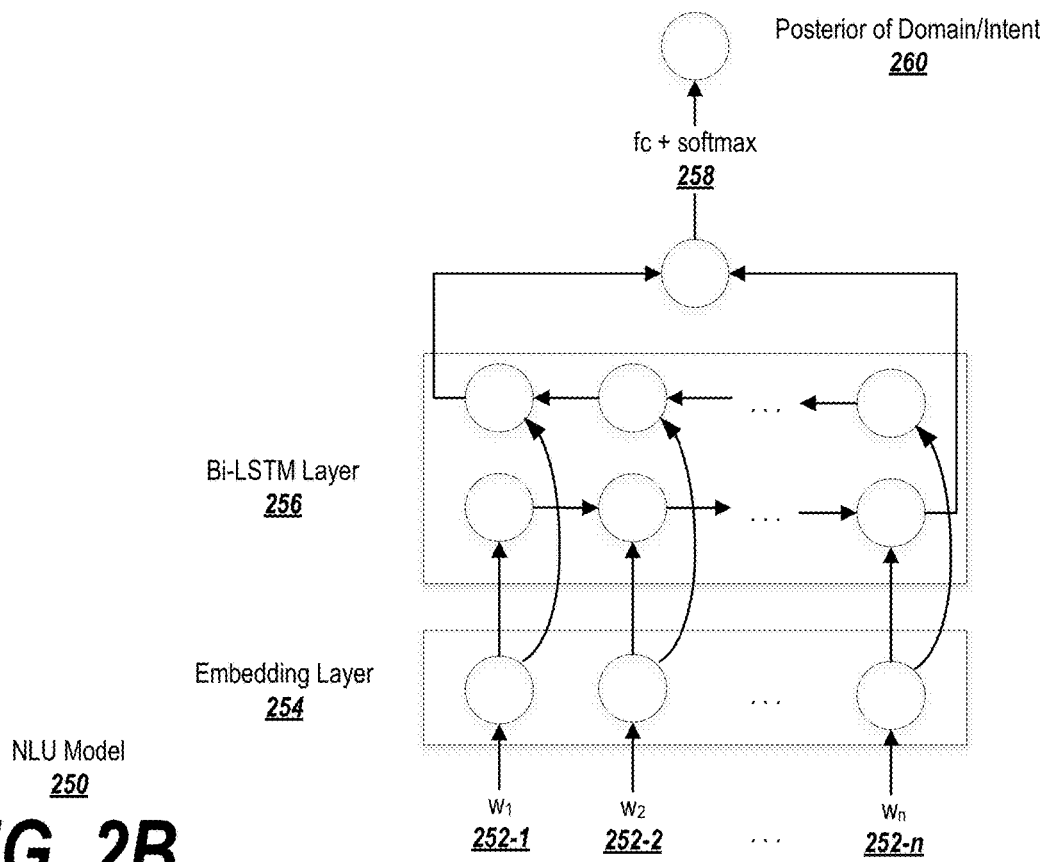
FIG. 2B depicts an example of a natural language understanding system.

FIG. 2B depicts an example of an NLU model 250 suitable for performing domain identification or intent determination. The depicted example is an LSTM-based utterance classifier, in which the input words 252 are first embedded in a dense representation in an embedding layer 254, and then an LSTM network is used to encode the word sequence (the depicted example uses a 2-layer bi-directional LSTM encoder 256). A softmax function 258 applied on the last fully connected (FC) layer provides a classification of domain or intent 260. Because the NLU system incurs much smaller latency compared to the ASR system and the classification only starts after the entire word sequence becomes available, it is possible to use bi-directional recurrent neural networks (RNNs) for the NLU, as shown in FIG. 2B.

Returning again to FIG. 1, when training is complete the SLU system 100 may receive audio data 106 for which semantic tasks such as domain identification, intent determination, or slot-filling are to be performed. The SR component 102 may analyze the input audio 106 and generate corresponding recognized text 118 for input to the NLU component 104. The trained NLU component 104 may utilize the various modules 112, 114, 116 to perform the semantic analysis and generate an output 120.

Conventionally, processing resources must be split between the speech recognition component 102 and the natural language understanding component 104. For example, consider a real-time implementation in which a user speaks and the SLU system 100 must process the input audio and generate an output in a relatively short amount of time. The system 100 may have only a finite number of processing resources that can be allocated in that timeframe. The system must choose how to divide the processing resources between the NLU 104 and the speech recognizer 102.

For instance, the system may choose to allocate processing resources evenly to the NLU 104 and SR 102 (e.g., a 50/50 split). If this proves to be insufficient for the ASR 108 to generate a reasonably accurate transcript, however, the NLU 104 may be unable to perform its classification tasks accurately. Accordingly, the system might allocate more processing resources to the SR 102 (e.g., a 60/40 split). Although this may improve the quality of the text transcript provided to the NLU 104, the NLU 104 would have correspondingly fewer resources to perform its classification tasks (so the output of the system may still be suboptimal).

Another problem with conventional SLU systems 100 is that the SR 102 and NLU 104 components are trained separately, using different criteria. For example, the SR unit 102 may be trained to minimize the word error rate (WER) when transcribing audio into text. This approach weighs all words equally when assigning a WER score, but in practice not all words contribute equally to the semantic meaning of a sentence. Thus, the SR 102 unit may be configured to devote more resources to words that, for purposes of the SLU system 100, may not be entirely consequential.

Similarly, the NLU 104 is typically trained on clean transcripts (i.e., without SR 102 errors). However, in real-world situations, the transcript provided to the NLU 104 will likely include some errors. Because the NLU 104 is not necessarily optimized for this situation, the performance of the NLU 104 can be degraded.

Still further, training an SLU system typically requires human-generated transcriptions of the input audio to train the SR component, and human-tagged transcripts to train the NLU component. It would be preferable to reduce the amount of human-generated training materials required, which may allow more training to occur with less effort.

Using the techniques described herein, an SLU system can be trained and operate as a single unit, which extracts semantic meaning directly from audio features. Because separate SR 102 and NLU 104 systems are not provided, the SLU system can devote all processing resources to a single component. This can result in outputs that are comparable to a typical SLU system 100 given fewer processing resources, or in better, more accurate outputs given the same resources.

As used herein, semantic features refer to information indicative of a meaning of the audio features. Semantic features may include, for example, features relating to the intent or domain of the audio features. Semantic features may also include information useful for assigning audio features to predefined slots. For instance, semantic features may be represented as a saliency map in which areas of the map corresponding to features of relatively high importance to the semantic meaning of the audio are differentiated from areas of the map corresponding to features of relatively low importance to the semantic meaning of the audio.

Figure 3:
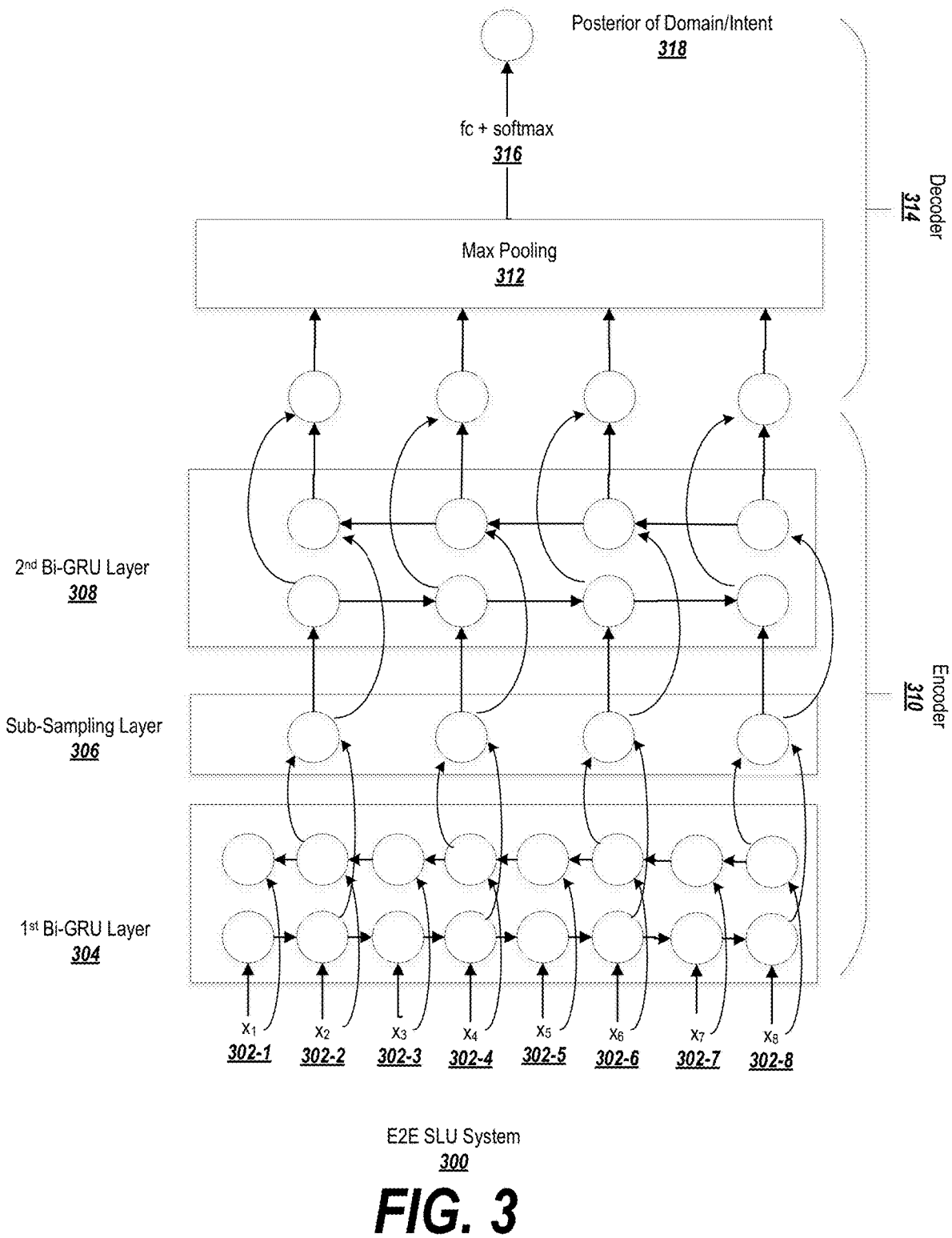
FIG. 3 depicts an example of an end-to-end spoken language understanding system according to an exemplary embodiment.

An exemplary end-to-end (E2E) SLU system 300 is depicted in FIG. 3. The SLU system 300 is built on a network including an encoder network 310 and a decoder network 314. The encoder network 310 accepts input features 302-$i$, which may be raw audio data or may be feature vectors (such as log-Mel spectrum feature vectors).

The encoder network 310 in this example is a multilayer bidirectional gated recurrent unit (GRU) network that includes a first bi-GRU layer 304 and a second bi-GRU layer 308. As will be understood by one of ordinary skill in the art, the example of FIG. 3 is simplified, and in practice will include an arbitrary number of layers 304, 308 as suitable to the particular application.

One potential issue when using log-Mel spectrum features as the input is that such features are typically generated every 10 ms. Although such a time frame is suitable for classifying sub-phone units such as CD-HMM states, it may not be suitable for utterance-level classifications since the GRUs may forget speech content when arriving at the end of the utterance. Furthermore, the network may be subject to gradient vanishing. Therefore, in order to reduce the sequence length processed by the GRUs, the hidden activations of the network may be subsampled along the time domain for each bi-directional GRU layer 304, 308 in a subsampling layer 306. This subsampling allows a representation to be extracted at roughly the syllable-level in a given utterance. At the same time, it also significantly reduces the computational time for both training and prediction, which allows bi-directional GRUs to be used for real-time intent and/or domain classification problems.

The output of the encoder 310 is provided to a max-pooling layer 312 along the time axis of the decoder 314. The max-pooling 312 is used to compress the output into a fixed dimension vector. This is followed by a fully-connected feed-forward layer 316, and a softmax layer is used to compute the posterior probability 318 of intents or domains.

Figure 4:
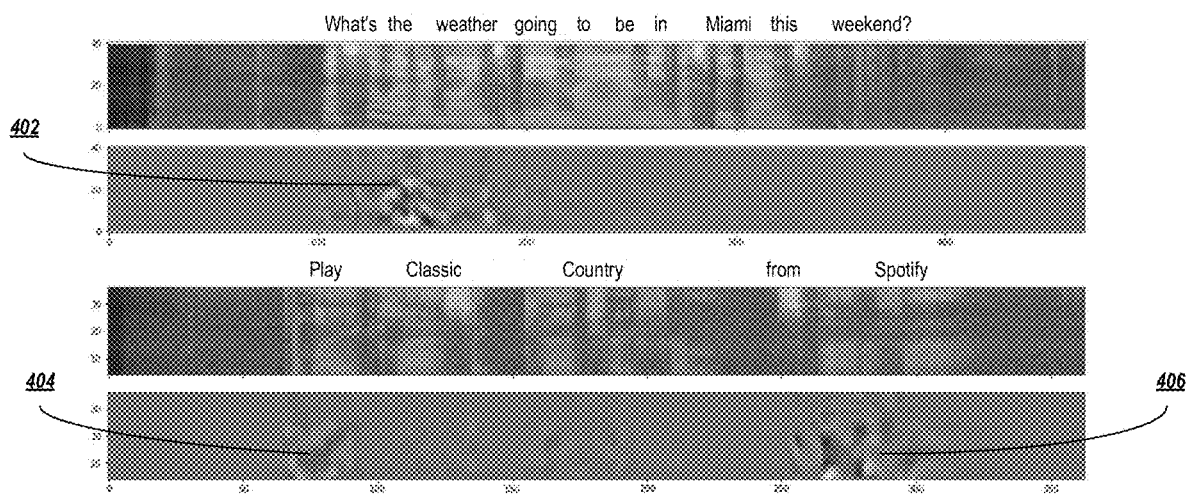
FIG. 4 depicts an example of audio features and corresponding saliency maps for an example of a speech-to-domain mapping.

FIG. 4 depicts the results of applying the exemplary E2E SLU system 300 to spoken utterances in an intent recognition task. In FIG. 4, the top image in each example represents the filter-bank features extracted from the utterance, and the bottom image represents a corresponding saliency map generated by the system 300. As can be seen, in the first example the model indicates a response 402 for the "what's the weather" portion of the utterance, whereas in the second example the model provides a response 404 to the "play" portion of the utterance and a second response 406 to the "Spotify" portion of the utterance. These are desirable results for an intent classifier.

Exemplary Logic

Figure 5:
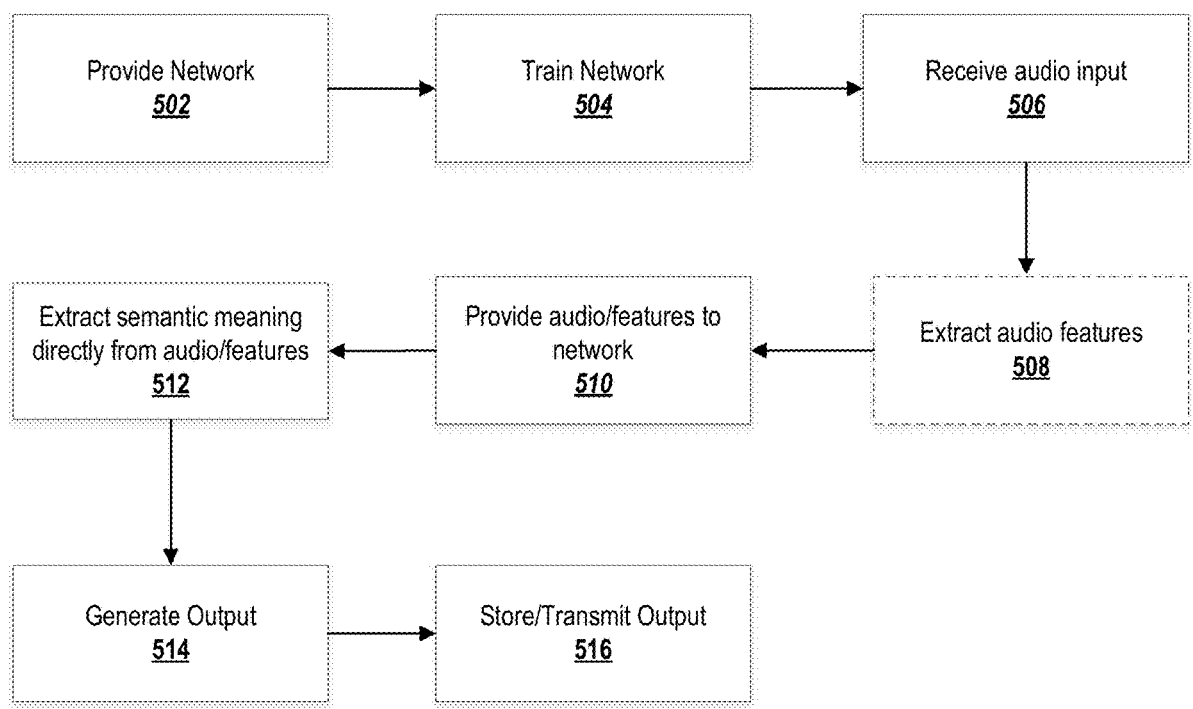
FIG. 5 is a flow chart depicting exemplary logic for performing a method according to exemplary embodiments.

FIG. 5 is a flow chart depicting exemplary sequence-to-sequence logic 500 for performing a method according to exemplary embodiments.

At block 502, an E2E SLU network may be provided, such as the network 300 depicted in FIG. 3. The E2E SLU may be a bidirectional network featuring gated recurrent units. The E2E SLU may be an encoder-decoder network. Optionally, the E2E SLU may apply an attention mechanism.

At block 504, the network may be trained with input data depending on the task intended for the network. For example, the network may be trained with audio tagged with domain tags for a domain identification network, or may be trained with audio tagged with intent tags for an intent identification network. In some cases, the network may optionally provide the output of a domain or intent classification portion of the network to a slot-filling portion of the network, if the intended task to which the network is to be applied is a slot-filling task. In this case, the training data may include audio and a predefined set of slots, and may further identify desired information to be added to the slots.

At block 506 (after training is complete), the system may receive audio input for domain/intent classification or for a slot filling task. The input may be received locally from an input audio device on a client running the logic 500, or may be received from a remote source. In some embodiments, the logic 500 may run on a server, and the input may be received from a remote client device. The audio received at block 506 may include raw audio data, such as frequency information corresponding to an audio recording.

At block 508, the system may optionally extract features from the audio, such as log-Mel spectrum feature vectors.

At block 510, the system may provide the audio received at block 506 and/or the features extracted at block 508 to the network. The audio may be sampled at predetermined intervals and frames of audio data/features may be provided to the network as they are acquired. The audio data and/or features may be provided as inputs to the network.

At block 512, the system may apply the network to extract semantic meaning directly from the raw audio or audio features. Extracting the semantic meaning may involve performing domain or intent classification, or performing a slot-filling task. Extracting the semantic meaning may be done without generating an intermediate textual representation of the audio.

At block 514, the system may generate an output. The output may be a domain or intent classification, or a list of parameters and an identification of a slot for each of the parameters (in a slot-filling task). The output may include multiple domain or intent classifications or slot lists and a corresponding probability that the network assigns to the respective classifications/lists.

At block 516, the output (and/or probabilities) may be stored locally in a memory and/or transmitted via a network. The output may be configured for use by a dialog manager or hands-free interface for a device such as a mobile device or virtual reality (VR) system.

Network Embodiments

Figure 6:
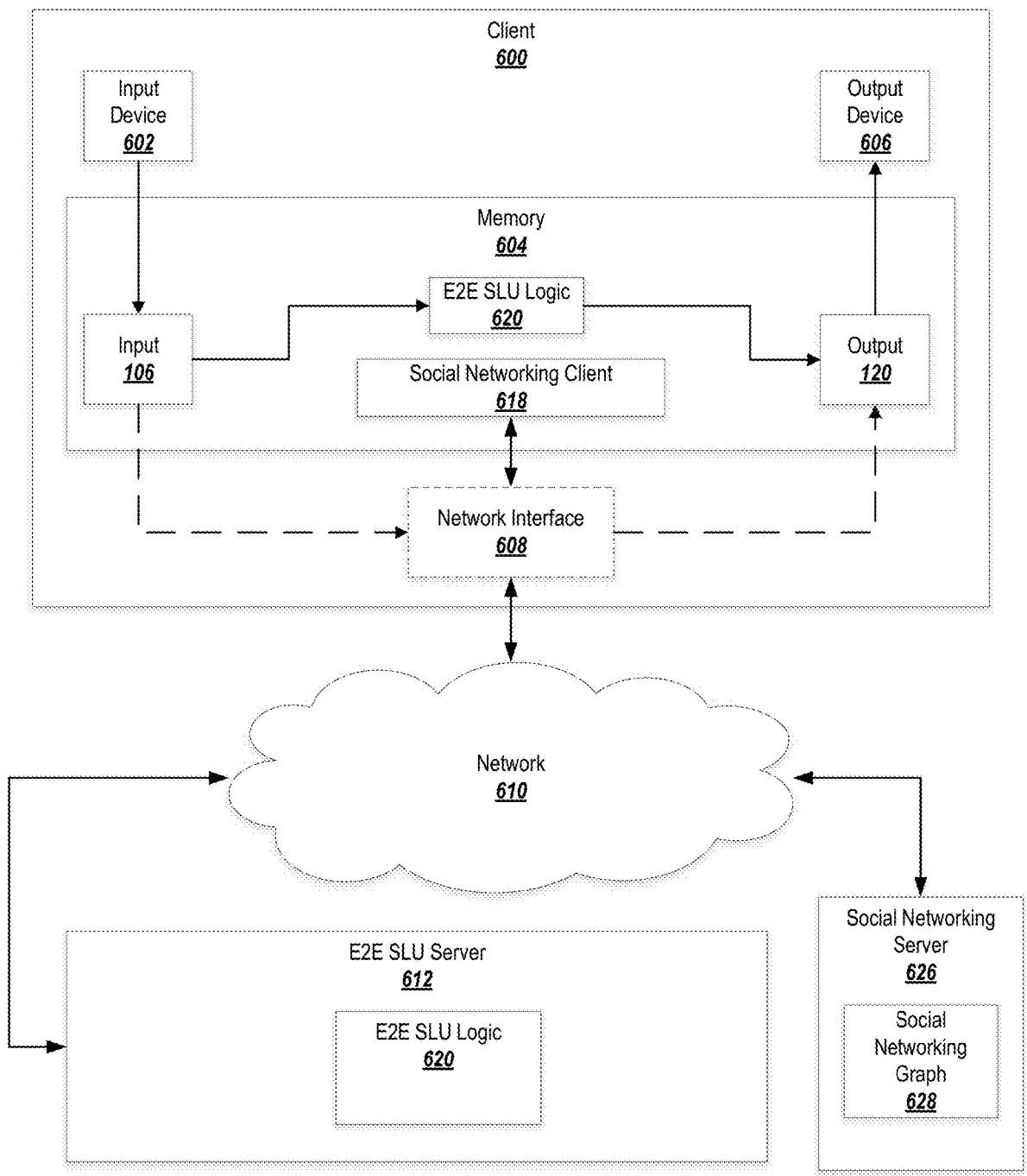
FIG. 6 depicts an exemplary network embodiment.

Some exemplary embodiments may be employed in a network environment, such as the environment depicted in FIG. 6.

A user may interact with a client 600, which may be (for example) a personal computer, tablet, mobile phone, special-purpose translation device, etc. In some embodiments, the client 600 does not require interaction from a user.

The client 600 may include one or more input devices 602 and one or more output devices 606. The input devices 602 may include, for example, microphones, keyboards, cameras, electronic pens, touch screens, and other devices for receiving an input sequence. The output devices 606 may include a speaker, a display device such as a monitor or touch screen, and other devices for presenting an output sequence.

In some embodiments, the input 106 from the input devices 602 may be in the form of an audio data that is sent to E2E SLU logic 620 for direct extraction of semantic features. In other embodiments, the client 600 may submit the input 106 to an E2E SLU server 612 hosting the E2E SLU logic 620 via a network interface 608. The E2E SLU Logic 620 may be used to generate an output 120, as described above.

The client 600 may include a memory 604, which may be a non-transitory computer readable storage medium, such as one or a combination of a hard drive, solid state drive, flash storage, read only memory, or random access memory. The memory 604 may hold a representation of an input 106 and/or a representation of an output 120, as well as one or more applications. For example, the memory 604 may store a social networking client 218 that allows a user to interact with a social networking service.

The output 120 may be in the form of text. In some embodiments, the desirable end form of the output may be something other than text, such as an audio representation of the intent or domain. Accordingly, the output 110 may be subjected to text-to-speech (TTS) logic to transform the text into an audio recording that is presentable by the output device 606. The TTS logic may be located at the client 600 (so that the output text is processed locally by the client 600 and corresponding audio is sent to the output device 606), or may be located remotely at the SLU server 612 (in which case, text may be processed at the server 612 and the resulting audio recording may be transmitted to the client 600). Other combinations of processing logic are also possible, depending on the desired final form for the output 120.

The client 600 may be provided with a network interface 608 for communicating with a network 610, such as the Internet. The network interface 608 may transmit the input 104 in a format and/or using a protocol compatible with the network 610 and may receive a corresponding output 120 from the network 610.

The network interface 608 may communicate through the network 610 with the SLU server 612. The SLU server 612 may host the SLU logic 620 for directly inferring semantic features from the input audio 106. The logic 120 may generate an output 120 from the input 106.

The network interface 608 of the client 600 may also be used to communicate through the network 610 with a social networking server 626. The social networking server 626 may include or may interact with a social networking graph 628 that defines connections in a social network. Furthermore, the server 612 may connect to the social networking server 626 for various purposes, such as retrieving training data from the social network.

A user of the client 600 may be an individual (human user), an entity (e.g., an enterprise, business, or third-party application), or a group (e.g., of individuals or entities) that interacts or communicates with or over the social-networking server 626. The social-networking server 626 may be a network-addressable computing system hosting an online social network. The social-networking server 626 may generate, store, receive, and send social-networking data, such as, for example, user-profile data, concept-profile data, social-graph information, or other suitable data related to the online social network. The social-networking server 626 may be accessed by the other components of the network environment either directly or via the network 610.

The social-networking server 626 may include an authorization server (or other suitable component(s)) that allows users to opt in to or opt out of having their actions logged by social-networking server 626 or shared with other systems (e.g., third-party systems, such as the sequence-to-sequence server 612), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 626 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example, and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example, and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example, and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social-networking server 626 or shared with other systems (e.g., a third-party system). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of a third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social-networking system 626 may send a request to the data store for the object. The request may identify the user associated with the request. The requested data object may only be sent to the user (or a client system 600 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network that may benefit from the above-described translation system. Targeting criteria used to identify and target users may include explicit, stated user interests on social-networking server 626 or explicit connections of a user to a node, object, entity, brand, or page on social-networking server 626. In addition, or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

Figure 7:
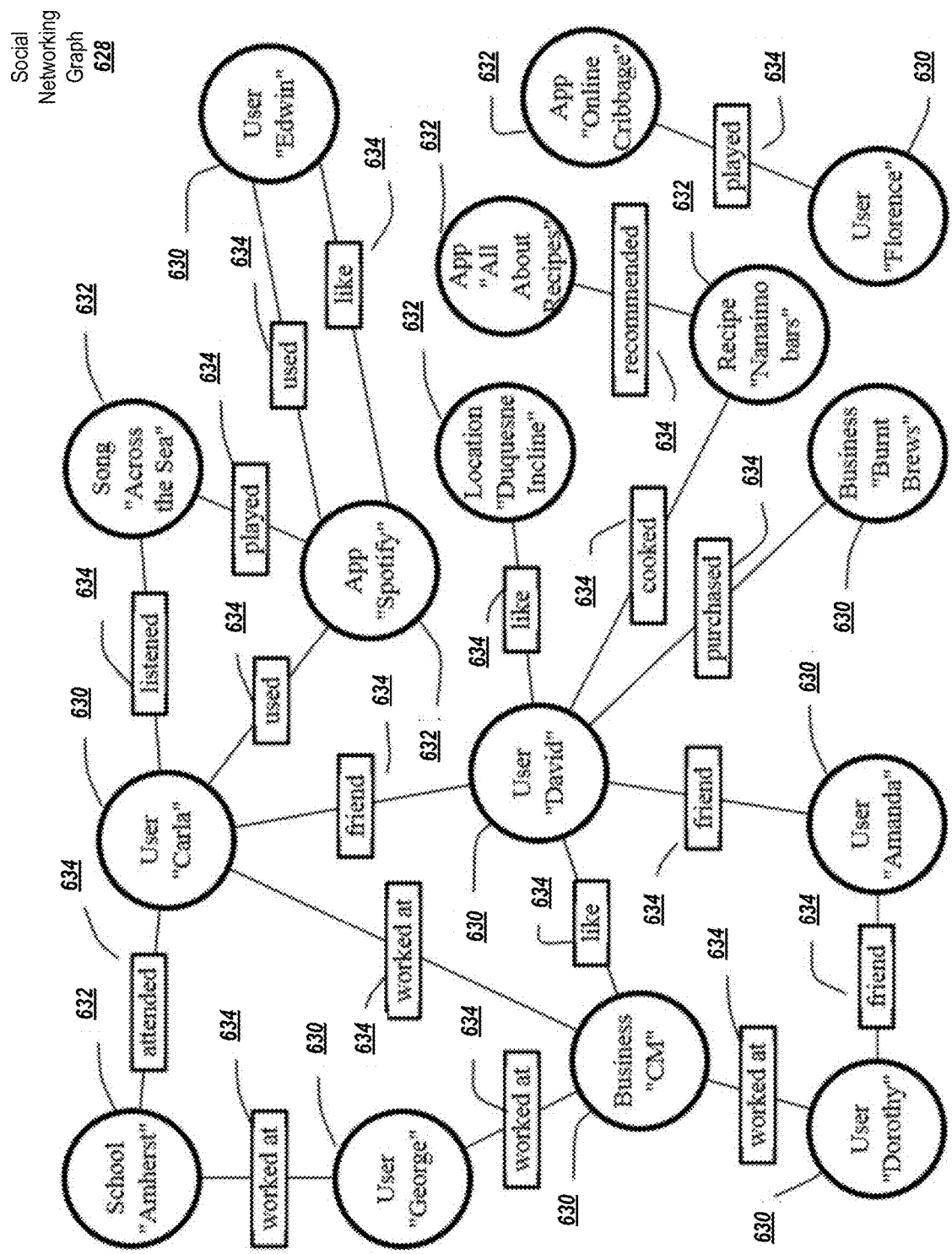
FIG. 7 describes the social networking graph depicted in FIG. 6 in more detail.

FIG. 7 illustrates an example of a social graph 628. In exemplary embodiments, a social-networking service may store one or more social graphs 628 in one or more data stores as a social graph data structure via the social networking service.

The social graph 628 may include multiple nodes, such as user nodes 630 and concept nodes 632. The social graph 628 may furthermore include edges 634 connecting the nodes. The nodes and edges of social graph 628 may be stored as data objects, for example, in a data store (such as a social-graph database). Such a data store may include one or more searchable or queryable indexes of nodes or edges of social graph 628.

The social graph 628 may be accessed by a social-networking server 726, client system 710, third-party system (e.g., the translation server 724), or any other approved system or device for suitable applications.

A user node 630 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 630 corresponding to the user, and store the user node 630 in one or more data stores. Users and user nodes 630 described herein may, where appropriate, refer to registered users and user nodes 630 associated with registered users. In addition, or as an alternative, users and user nodes 630 described herein may, where appropriate, refer to users that have not registered with the social-networking system. In particular embodiments, a user node 630 may be associated with information provided by a user or information gathered by various systems, including the social-networking system. As an example, and not by way of limitation, a user may provide their name, profile picture, contact information, birth date, sex, marital status, family status, employment, education background, preferences, interests, or other demographic information. In particular embodiments, a user node 630 may be associated with one or more data objects corresponding to information associated with a user. In particular embodiments, a user node 630 may correspond to one or more webpages. A user node 630 may be associated with a unique user identifier for the user in the social-networking system.

In particular embodiments, a concept node 632 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 632 may be associated with information of a concept provided by a user or information gathered by various systems, including the social-networking system. As an example, and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 632 may be associated with one or more data objects corresponding to information associated with concept node 632. In particular embodiments, a concept node 632 may correspond to one or more webpages.

In particular embodiments, a node in social graph 628 may represent or be represented by a webpage (which may be referred to as a "profile page"). Profile pages may be hosted by or accessible to the social-networking system. Profile pages may also be hosted on third-party websites associated with a third-party server. As an example, and not by way of limitation, a profile page corresponding to a particular external webpage may be the particular external webpage and the profile page may correspond to a particular concept node 632. Profile pages may be viewable by all or a selected subset of other users. As an example, and not by way of limitation, a user node 630 may have a corresponding user-profile page in which the corresponding user may add content, make declarations, or otherwise express himself or herself. A business page may comprise a user-profile page for a commerce entity. As another example and not by way of limitation, a concept node 632 may have a corresponding concept-profile page in which one or more users may add content, make declarations, or express themselves, particularly in relation to the concept corresponding to concept node 632.

In particular embodiments, a concept node 632 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example, and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 630 corresponding to the user and a concept node 632 corresponding to the third-party webpage or resource and store edge 634 in one or more data stores.

In particular embodiments, a pair of nodes in social graph 628 may be connected to each other by one or more edges 634. An edge 634 connecting a pair of nodes may represent a relationship between the pair of nodes. In particular embodiments, an edge 634 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 634 connecting the first user's user node 630 to the second user's user node 630 in social graph 628 and store edge 634 as social-graph information in one or more data stores. In the example of FIG. 7, social graph 628 includes an edge 634 indicating a friend relation between user nodes 630 of user "Amanda" and user "Dorothy." Although this disclosure describes or illustrates particular edges 634 with particular attributes connecting particular user nodes 630, this disclosure contemplates any suitable edges 634 with any suitable attributes connecting user nodes 630. As an example, and not by way of limitation, an edge 634 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 628 by one or more edges 634.

In particular embodiments, an edge 634 between a user node 630 and a concept node 632 may represent a particular action or activity performed by a user associated with user node 630 toward a concept associated with a concept node 632. As an example, and not by way of limitation, as illustrated in FIG. 7, a user may "like," "attended," "played," "listened," "cooked," "worked at," or "watched" a concept, each of which may correspond to a edge type or subtype. A concept-profile page corresponding to a concept node 632 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 634 and a "used" edge (as illustrated in FIG. 7) between user nodes 630 corresponding to the user and concept nodes 632 corresponding to the song and application to indicate that the user listened to the song and used the application. Moreover, the social-networking system may create a "played" edge 634 (as illustrated in FIG. 7) between concept nodes 632 corresponding to the song and the application to indicate that the particular song was played by the particular application. In this case, "played" edge 634 corresponds to an action performed by an external application (SPOTIFY) on an external audio file (the song "Across the Sea"). Although this disclosure describes particular edges 634 with particular attributes connecting user nodes 630 and concept nodes 632, this disclosure contemplates any suitable edges 634 with any suitable attributes connecting user nodes 630 and concept nodes 632. Moreover, although this disclosure describes edges between a user node 630 and a concept node 632 representing a single relationship, this disclosure contemplates edges between a user node 630 and a concept node 632 representing one or more relationships. As an example, and not by way of limitation, an edge 634 may represent both that a user likes and has used at a particular concept. Alternatively, another edge 634 may represent each type of relationship (or multiples of a single relationship) between a user node 630 and a concept node 632 (as illustrated in FIG. 7 between user node 630 for user "Edwin" and concept node 632 for "SPOTIFY").

In particular embodiments, the social-networking system may create an edge 634 between a user node 630 and a concept node 632 in social graph 628. As an example, and not by way of limitation, a user viewing a concept-profile page (such as, for example, by using a web browser or a special-purpose application hosted by the user's client system) may indicate that he or she likes the concept represented by the concept node 632 by clicking or selecting a "Like" icon, which may cause the user's client system to send to the social-networking system a message indicating the user's liking of the concept associated with the concept-profile page. In response to the message, the social-networking system may create an edge 634 between user node 630 associated with the user and concept node 632, as illustrated by "like" edge 634 between the user and concept node 632. In particular embodiments, the social-networking system may store an edge 634 in one or more data stores. In particular embodiments, an edge 634 may be automatically formed by the social-networking system in response to a particular user action. As an example, and not by way of limitation, if a first user uploads a picture, watches a movie, or listens to a song, an edge 634 may be formed between user node 630 corresponding to the first user and concept nodes 632 corresponding to those concepts. Although this disclosure describes forming particular edges 634 in particular manners, this disclosure contemplates forming any suitable edges 634 in any suitable manner.

The social graph 628 may further comprise a plurality of product nodes. Product nodes may represent particular products that may be associated with a particular business. A business may provide a product catalog to a consumer-to-business service and the consumer-to-business service may therefore represent each of the products within the product in the social graph 628 with each product being in a distinct product node. A product node may comprise information relating to the product, such as pricing information, descriptive information, manufacturer information, availability information, and other relevant information. For example, each of the items on a menu for a restaurant may be represented within the social graph 628 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 628. The information for a product node may be manipulated by the social-networking system as a product object that encapsulates information regarding the referenced product.

As such, the social graph 628 may be used to infer shared interests, shared experiences, or other shared or common attributes of two or more users of a social-networking system. For instance, two or more users each having an edge to a common business, product, media item, institution, or other entity represented in the social graph 628 may indicate a shared relationship with that entity, which may be used to suggest customization of a use of a social-networking system, including a messaging system, for one or more users.

Computer-Related Embodiments

Figure 8:
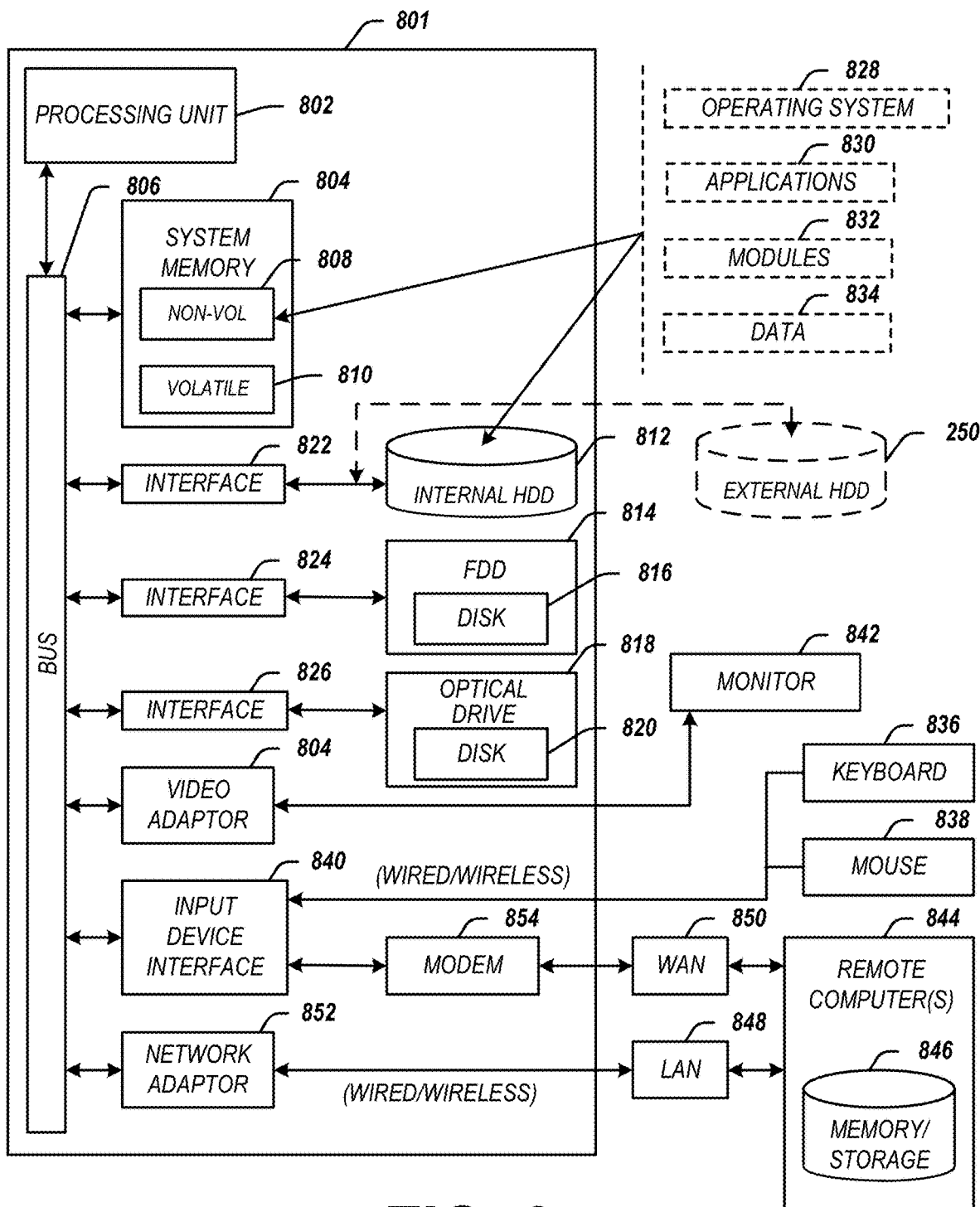
FIG. 8 depicts an exemplary computing device suitable for use with exemplary embodiments.

The above-described methods may be embodied as instructions on a computer readable medium or as part of a computing architecture. FIG. 8 illustrates an embodiment of an exemplary computing architecture 800 suitable for implementing various embodiments as previously described. In one embodiment, the computing architecture 800 may comprise or be implemented as part of an electronic device, such as a computer 801. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 802, a system memory 804 and a system bus 806. The processing unit 802 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 802.

The system bus 806 provides an interface for system components including, but not limited to, the system memory 804 to the processing unit 802. The system bus 806 can be any of several types of bus structure that may further interconnect to a memory bus (with or without a memory controller), a peripheral bus, and a local bus using any of a variety of commercially available bus architectures. Interface adapters may connect to the system bus 806 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 804 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 804 can include non-volatile memory 808 and/or volatile memory 810. A basic input/output system (BIOS) can be stored in the non-volatile memory 808.

The computing architecture 800 may include various types of computer-readable storage media in the form of one or more lower speed memory units, including an internal (or external) hard disk drive (HDD) 812, a magnetic floppy disk drive (FDD) 814 to read from or write to a removable magnetic disk 816, and an optical disk drive 818 to read from or write to a removable optical disk 820 (e.g., a CD-ROM or DVD). The HDD 812, FDD 814 and optical disk drive 820 can be connected to the system bus 806 by an HDD interface 822, an FDD interface 824 and an optical drive interface 826, respectively. The HDD interface 822 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 808, 812, including an operating system 828, one or more application programs 830, other program modules 832, and program data 834. In one embodiment, the one or more application programs 830, other program modules 832, and program data 834 can include, for example, the various applications and/or components of the messaging system 500.

A user can enter commands and information into the computer 801 through one or more wire/wireless input devices, for example, a keyboard 836 and a pointing device, such as a mouse 838. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 802 through an input device interface 840 that is coupled to the system bus 806, but can be connected by other interfaces such as a parallel port, IEEE 694 serial port, a game port, a USB port, an IR interface, and so forth.

A monitor 842 or other type of display device is also connected to the system bus 806 via an interface, such as a video adaptor 844. The monitor 842 may be internal or external to the computer 801. In addition to the monitor 842, a computer typically includes other peripheral output devices, such as speakers, printers, and so forth.

The computer 801 may operate in a networked environment using logical connections via wire and/or wireless communications to one or more remote computers, such as a remote computer 844. The remote computer 844 can be a workstation, a server computer, a router, a personal computer, portable computer, microprocessor-based entertainment appliance, a peer device or other common network node, and typically includes many or all of the elements described relative to the computer 801, although, for purposes of brevity, only a memory/storage device 846 is illustrated. The logical connections depicted include wire/wireless connectivity to a local area network (LAN) 848 and/or larger networks, for example, a wide area network (WAN) 850. Such LAN and WAN networking environments are commonplace in offices and companies, and facilitate enterprise-wide computer networks, such as intranets, all of which may connect to a global communications network, for example, the Internet.

When used in a LAN networking environment, the computer 801 is connected to the LAN 848 through a wire and/or wireless communication network interface or adaptor 852. The adaptor 852 can facilitate wire and/or wireless communications to the LAN 848, which may also include a wireless access point disposed thereon for communicating with the wireless functionality of the adaptor 852.

When used in a WAN networking environment, the computer 801 can include a modem 854, or is connected to a communications server on the WAN 850, or has other means for establishing communications over the WAN 850, such as by way of the Internet. The modem 854, which can be internal or external and a wire and/or wireless device, connects to the system bus 806 via the input device interface 840. In a networked environment, program modules depicted relative to the computer 801, or portions thereof, can be stored in the remote memory/storage device 846. It will be appreciated that the network connections shown are exemplary and other means of establishing a communications link between the computers can be used.

The computer 801 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
   receiving, as input, an audio representation of speech having semantic characteristics;
   providing the audio representation to a spoken language understanding (SLU) network;
   extracting, by the SLU network, filter-bank features of the audio representation;
   generating, by the SLU network, a saliency map based on the extracted filter-bank features;
   determining, by the SLU network, a first portion of the saliency map corresponds to a first high-importance feature and a second portion of the saliency map corresponds to a second high-importance feature different from the first high-importance feature, at least the first and the second high-importance features providing meaning to the semantic characteristics;
   inferring, by the SLU network, intent of the speech directly from at least the first and the second high-importance features of the saliency map; and
   outputting, by the SLU network, a first response to the first high-importance feature and a second response different from the first response to the second high-importance feature.

2. The method of claim 1, wherein inferring the semantic characteristics is performed without generating an intermediate text representation of the input audio.

3. The method of claim 1, wherein the audio representation input into the network is a raw audio signal.

4. The method of claim 1, wherein the audio representation input into the network is log-Mel spectrum feature vectors of the audio representation.

5. The method of claim 1, wherein the semantic characteristics include an identification of a domain of speech in the input audio.

6. The method of claim 1, wherein the semantic characteristics include an identification of an intent of speech in the input audio.

7. The method of claim 1, wherein the network is a recurrent gated unit network.

8. A non-transitory computer-readable medium storing instructions that, when executed by one or more processors, cause the one or more processors to:
   receive, as input, an audio representation of speech having semantic characteristics;
   provide the audio representation to a spoken language understanding (SLU) network;
   extract, by the SLU network, filter-bank features of the audio representation;
   generate, by the SLU network, a saliency map based on the extracted filter-bank features;
   determine, by the SLU network, a first portion of the saliency map corresponds to a first high-importance feature and a second portion of the saliency map corresponds to a second high-importance feature different from the first high-importance feature, at least the first and the second high-importance features providing meaning to the semantic characteristics;
   infer, by the SLU network, intent of the speech directly from at least the first and the second high-importance features of the saliency map; and
   output, by the SLU network, a first response to the first high-importance feature and a second response different from the first response to the second high-importance feature.

9. The medium of claim 8, wherein inferring the semantic characteristics is performed without generating an intermediate text representation of the input audio.

10. The medium of claim 8, wherein the audio representation input into the network is a raw audio signal.

11. The medium of claim 8, wherein the audio representation input into the network is log-Mel spectrum feature vectors of the audio representation.

12. The medium of claim 8, wherein the semantic characteristics include an identification of a domain of speech in the input audio.

13. The medium of claim 8, wherein the semantic characteristics include an identification of an intent of speech in the input audio.

14. The medium of claim 8, wherein the network is a recurrent gated unit network.

15. An apparatus comprising:
at least one hardware processor circuit operable to execute stored instructions that, when executed, causes the at least one hardware processor circuit to:
receive an audio representation of speech having semantic characteristics;
provide the audio representation to a spoken language understanding (SLU) network;
extract, by the SLU network, filter-bank features of the audio representation;
generate, by the SLU network, a saliency map based on the extracted filter-bank features;
determine, by the SLU network, a first portion of the saliency map corresponds to a first high-importance feature and a second portion of the saliency map corresponds to a second high-importance feature different from the first high-importance feature, at least the first and the second high-importance features providing meaning to the semantic characteristics;
infer, by the SLU network, intent of the speech directly from at least the first and the second high-importance features of the saliency map; and
output, by the SLU network, a first response to the first high-importance feature and a second response different from the first response to the second high-importance feature.

16. The apparatus of claim 15, wherein inferring the semantic characteristics is performed without generating an intermediate text representation of the input audio.

17. The apparatus of claim 15, wherein the audio representation input into the network is a raw audio signal or log-Mel spectrum feature vectors of the audio representation.

18. The apparatus of claim 15, wherein the semantic characteristics include an identification of a domain of speech in the input audio.

19. The apparatus of claim 15, wherein the semantic characteristics include an identification of an intent of speech in the input audio.

20. The apparatus of claim 15, wherein the network is a recurrent gated unit network.

\* \* \* \* \*